June 14, 1960 S. S. PRENTISS 2,940,251
CONTROL OF PRESSURE IN ROCKET MOTORS
Filed Sept. 17, 1954
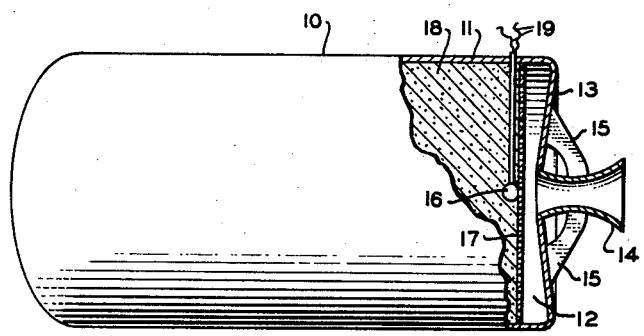
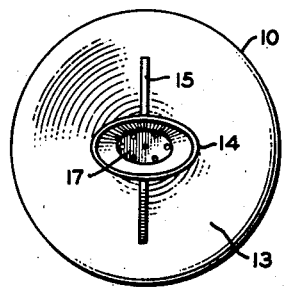
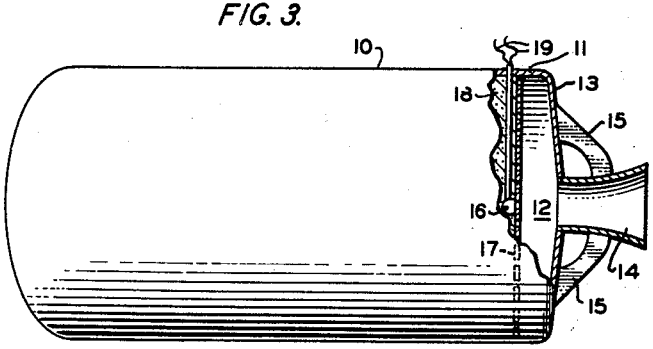
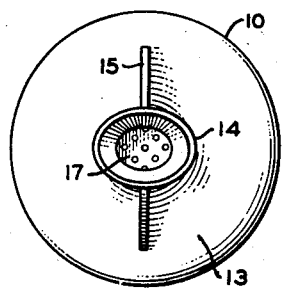
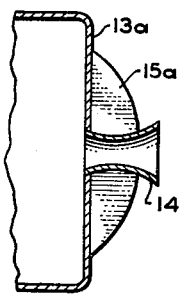
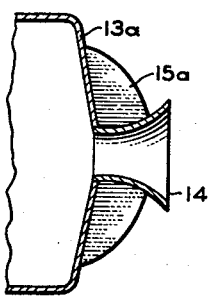
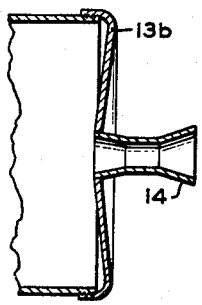
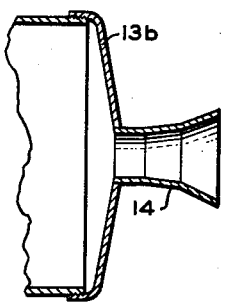
INVENTOR.
S. S. PRENTISS
BY Hudson and Young
ATTORNEYS United States Patent Office 2,940,251
Patented June 14, 1960

2,940,251
CONTROL OF PRESSURE IN ROCKET MOTORS

Spencer S. Prentiss, Bartlesville, Okla., assignor to Phillips Petroleum Company, a corporation of Delaware Filed Sept. 17, 1954, Ser. No. 456,820

6 Claims. (Cl. 60—35.6)

This invention relates to rocket motors. In one of its more specific aspects it relates to a means for controlling the pressure developed in a rocket motor. In another of its more specific aspects it relates to an improved rocket motor wherein the cross-sectional area of the exhaust nozzle is varied so as to control the pressure in the combustion chamber of the motor.

Rocket motors employing solid propellants have many applications, for example, propulsion of missiles, furnishing power to aircraft for take-off operations, and for providing bursts of speed for flying aircraft. The burning rates of most solid propellants are sensitive to pressure in that the burning rate increases with an increase in pressure. In some cases a considerable reduction in pressure will result in termination of combustion and conversely an increase in pressure will cause an increase in burning rate and the cycle thus set up will result in bursting the rocket case. While it is possible to substantially match the burning rate of a rocket grain to the exhaust nozzle area, rigid specifications of rocket motor construction and chemical constituents of the propellant are required.

A rocket motor casing or shell must be capable of withstanding a substantial build-up of pressure so as to provide the necessary pressure for optimum burning rate for pressure sensitive solid propellants. In addition to this the casing or shell should be strong enough to allow for pressures generated in excess of the calculated pressure for a propellant burning normally so as to allow for excessive burning rate resulting from fissuring or breakdown of the propellant grain.

Solid propellant rocket motors will ordinarily operate at a pressure in the range 300 to 1000 p.s.i.a. although the casing should be capable of withstanding a pressure as high as 2000 p.s.i.a.

The specifications of both rocket motor and propellant composition could be relaxed if even a small adjustment could be made to the exhaust nozzle area so as to correct the combustion chamber pressure.

The following objects will be attained by the aspects of this invention.

It is an object of this invention to provide a simple, dependable, automatic means for increasing the cross-sectional area of the exhaust nozzle of a rocket motor upon attaining a predetermined maximum pressure.

Another object is the provision of a rocket motor having an exhaust nozzle which increases in cross-sectional area at a predetermined combustion chamber pressure.

It is still another object to provide a rocket motor, utilizing a solid propellant, in which the danger of bursting the rocket case is minimized.

It is a further object to provide a simple and positive means for relieving excess pressure in the combustion zone of a solid propellant rocket.

Other objects and advantages will be apparent to those skilled in the art upon studying the following description of the invention and the attached drawing wherein:

Figure 1 illustrates in schematic form a partially exploded view of the rocket motor of this invention;

Figure 2 is an end view of Figure 1;

Figure 3 is a view of the rocket motor of Figure 1 wherein the area of the exhaust nozzle has been increased;

Figure 4 is an end view of Figure 3;

Figure 5 is a partial view of a modification of the rocket motor of Figure 1;

Figure 6 is a view of the rocket motor of Figure 5 after the area of the exhaust nozzle has been increased;

Figure 7 is a partial view of another modification of the rocket motor of Figure 1; and Figure 8 illustrates the rocket motor of Figure 7 after the area of the exhaust nozzle has been increased.

I have devised a rocket motor wherein the end of the rocket case adjacent the combustion zone is constructed so as to deform outwardly upon the attainment of a predetermined pressure within the combustion chamber of the rocket motor, the predetermined pressure being less than the bursting pressure of the rocket motor casing or shell. The said end of the rocket motor casing contains the exhaust nozzle through which the high velocity gases, created by combustion of the propellant, are expelled. This exhaust nozzle is elliptical in cross-sectional area when the end of the rocket motor is in normal position and is deformed toward a circular cross-sectional form when the end of the rocket is deformed outwardly as a result of a predetermined pressure being generated in the combustion zone of the rocket motor. The change in form of the exhaust nozzle from the form of an ellipse in the direction of the form of a circle increases the area of the exhaust nozzle and relieves the pressure in the combustion zone of the rocket motor.

When the pressure in the combustion zone is reduced the end wall tends to return to normal position thus reducing the cross-sectional area of the exhaust nozzle. The pressure in the combustion chamber of the rocket is thus controlled within a range to produce smooth and safe burning of the solid propellant charge.

Referring now to the drawing, and particularly to Figure 1, a rocket motor 10 contains in a shell 11, a solid propellant charge 18 supported by a perforated plate 17 in the usual manner. Combustion chamber 12 is situated in shell adjacent the solid propellant charge and end plate 13. End plate 13 is secured to shell 11 by weld, threaded coupling or other manner, or it may be integral. End plate 13 thus comprises one wall of combustion chamber 12 and carries exhaust nozzle 14. End plate 13 is deformed inwardly and exhaust nozzle 14 is elliptical in cross-sectional area as is shown in Figure 2. Arm members 15 are secured to end plate 13 and also to nozzle 14 at the vena contracta of the venturi. Ignition means 16 can be a charge of black powder containing spaced electrical wires 19 which produce a spark so as to ignite the powder charge and thus the solid propellant. Any suitable ignition means can be used.

Figure 3 represents the rocket motor of Figure 1 when the pressure in combustion chamber 12 has deformed end plate 13 so as to dilate the exhaust nozzle 14.

Figure 5 illustrates a modification of the rocket motor of Figure 1 wherein the end plate 13a is not creased or deformed inwardly. The arm members 15a are attached to exhaust nozzle 14 from the point of intersection of end plate 13a and nozzle 14 to a point above the vena contracta of the venturi of exhaust nozzle 14. The arm members 15a exert a lever action on nozzle 14 when the end plate is deformed outwardly so as to convert the normally oval or elliptical exhaust nozzle 14 into a substantially circular nozzle as is shown in Figure 6.

In the modification shown in Figure 7 the arm members 15 or 15a are not employed. The end plate 13b is creased or deformed inwardly and the exhaust nozzle is elliptical in cross-sectional area in its contracted form. Excess internal pressure deforms the end plate 13b outwardly so as to dilate the exhaust nozzle into substantially circular cross-sectional area as is shown in Figure 8.

As an example of the operation of the variable cross-sectional area exhaust nozzle of my invention, a rocket motor constructed to accommodate a solid rocket charge 10 inches by 40 inches is charged with a tubular grain of JPN-ballistite having a center opening of 3 inches. The exhaust nozzle is situated in a flat end plate adjacent the combustion chamber, is elliptical in cross-section and has an area of about 2.22 sq. in. in its normal position. A Bourdon tube is connected to the combustion chamber of the rocket motor so as to indicate the pressure generated within the combustion chamber. The charge is ignited at a temperature of about 70° F. and the pressure rises quickly to 800 p.s.i.a. but does not increase appreciably above 800 p.s.i.a. during the burning period of the charge. The burning period is about 6.25 seconds.

In order to maintain the pressure at about 800 p.s.i.a., the area of the nozzle is increased to about 7.4 sq. in. during the burning period. When the area of the nozzle is 7.4 sq. in., due to outward deformation of the end plate of the rocket motor, the nozzle is still in the form of an ellipse but approaches an O shape. If the area of the exhaust nozzle is not increased during the firing of the charge, the pressure would build up quickly to a point where the shell of the motor would fail and the rocket motor would burst.

The composition of JPN ballistite is as follows:

| Constituent: | Wt. percent |
|---|---|
| Nitrocellulose (13.25% N) | 51.50 |
| Nitroglycerin | 43.00 |
| Diethyl phthalate | 3.25 |
| Ethyl centralite | 1.00 |
| Potassium sulfate | 1.25 |
| Carbon black (added) | 0.20 |
| Candelilla wax (added) | 0.08 |

Reasonable variations and modifications are possible within the scope of the disclosure of the present invention, the essence of which is the provision of a positive and simple method for increasing the cross-sectional area of a rocket exhaust nozzle by changing the form of the nozzle from an ellipse to a circle and a novel rocket motor having such variable area nozzle incorporated therein.

That which is claimed is:

1. A rocket motor comprising a shell; a propellant charge and a combustion chamber enclosed within said shell; an end wall of said shell adjacent said combustion chamber adapted so as to be deformed outwardly at a pressure less than the bursting pressure of said shell; and elliptical exhaust nozzle means located in said end wall adapted so as to be deformed into an O shaped nozzle means by outward deformation of said end wall.

2. A rocket motor comprising a casing having a closed end; a solid propellant charge in said casing; a wall forming a closure for the other end of said casing; an elliptical exhaust nozzle means positioned in the center portion of said wall; and rigid members secured to the external of said wall and to the sides of said elliptical nozzle on the shorter axis of said elliptical nozzle.

3. In a rocket motor comprising a solid propellant charge and a combustion chamber contained in a shell, the improvement comprising a wall of said combustion chamber adapted so as to be deformed outwardly at a pressure less than the bursting pressure of said combustion chamber; elliptical exhaust means in said wall; and means operatively connected to said wall and said exhaust means so as to deform said elliptical exhaust means into a substantially circular exhaust means when said wall is deformed outwardly.

4. In a rocket motor comprising a solid propellent charge and a combustion chamber contained in a shell, the improvement comprising a wall of said combustion chamber deformable outwardly at a pressure less than the bursting pressure of said shell; and elliptical exhaust nozzle means positioned in said wall so that the exhaust means is deformed into a substantially circular exhaust nozzle when said wall is deformed outwardly.

5. In a rocket motor having a combustion chamber and a solid propellent contained in a shell, the improvement comprising an inwardly deformed wall deformable outwardly at a pressure less than the bursting pressure of said shell; and elliptical exhaust nozzle means positioned in said wall so that the exhaust means will be deformed into a substantially circular exhaust nozzle when said wall is deformed outwardly.

6. A rocket motor comprising a shell; a propellant charge and a combustion chamber enclosed within said shell; an end wall of said shell deformed inwardly along a crease and deformable outwardly at a pressure less than the bursting pressure of said shell; and an elliptical nozzle exhaust means centrally positioned in said wall so that the longer cross-sectional axis of said nozzle ellipse lies along said crease so as to be deformed into a substantially circular nozzle by outward deformation of said wall.

References Cited in the file of this patent

UNITED STATES PATENTS

| 25,894 | Fridley et al. | Oct. 25, 1859 |
| 1,641,778 | Overton | Sept. 6, 1927 |
| 2,371,449 | Langdon | Mar. 13, 1945 |
| 2,402,741 | Draviner | June 25, 1946 |
| 2,447,200 | Miller | Aug. 17, 1948 |
| 2,489,953 | Burney | Nov. 29, 1949 |
| 2,552,497 | Roach et al. | May 8, 1951 |
| 2,563,270 | Price | Aug. 7, 1951 |
| 2,627,160 | McDonald | Feb. 3, 1953 |
| 2,642,259 | Catlin | June 16, 1953 |
| 2,644,663 | Klingler | July 7, 1953 |
| 2,735,642 | Norman | Feb. 21, 1956 |
| 2,753,801 | Cumming | July 10, 1956 |

FOREIGN PATENTS

| 593,022 | Great Britain | Oct. 7, 1947 |